(12) United States Patent
Jacobs et al.

(10) Patent No.: US 9,793,738 B2
(45) Date of Patent: Oct. 17, 2017

(54) WIRELESS POWER TRANSFER FOR CHARGEABLE DEVICES

(71) Applicant: QUALCOMM Incorporated, San Diego, CA (US)

(72) Inventors: Paul E. Jacobs, La Jolla, CA (US); Miles A. Kirby, San Diego, CA (US); Ernest T. Ozaki, Poway, CA (US); Michael J. Mangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 888 days.

(21) Appl. No.: 13/897,283

(22) Filed: May 17, 2013

(65) Prior Publication Data
US 2013/0249481 A1 Sep. 26, 2013

Related U.S. Application Data

(62) Division of application No. 12/604,223, filed on Oct. 22, 2009, now abandoned.
(Continued)

(51) Int. Cl.
H02J 7/00 (2006.01)
H02J 7/02 (2016.01)
H02J 5/00 (2016.01)

(52) U.S. Cl.
CPC .............. *H02J 7/025* (2013.01); *H02J 5/005* (2013.01); *H02J 7/0054* (2013.01)

(58) Field of Classification Search
CPC .......... H02J 5/005; H02J 7/025; H02J 7/0054; G01R 29/08
(Continued)

(56) References Cited

U.S. PATENT DOCUMENTS 6,014,011 A 1/2000 Defelice et al.
7,375,493 B2 5/2008 Calhoon et al.
(Continued)

FOREIGN PATENT DOCUMENTS

CN 1276642 A 12/2000
CN 1441617 A 9/2003
(Continued)

OTHER PUBLICATIONS

International Search Report—PCT/US2010/026567, International Search Authority—European Patent Office—May 31, 2010.
Written Opinion—PCT/US2010/026567—ISA/EPO—May 31, 2010.

Primary Examiner — Edward Tso
Assistant Examiner — Aaron Piggush
(74) Attorney, Agent, or Firm — Knobbe, Martens, Olson & Bear, LLP

(57) ABSTRACT

Apparatus and methods directed to wireless power are disclosed. A charging device includes an antenna circuit for wirelessly receiving power from a first device via a power antenna. Received power can be stored in an energy storage device. The antenna circuit can wirelessly power or charge a plurality of second electronic devices via the power antenna based on power stored in the energy storage device. Furthermore, a wireless charging apparatus is disclosed that includes a display for receiving a device placed on its surface. Changes in a magnetic field in response to the placement of the chargeable electronic device on the surface of the display is detected. A communication link with the chargeable electronic device in response to the change in the level of the magnetic field is activated. A transmit antenna circuit wirelessly transmits power to the chargeable electronic device.

18 Claims, 10 Drawing Sheets

Related U.S. Application Data

(60) Provisional application No. 61/158,396, filed on Mar. 8, 2009, provisional application No. 61/165,876, filed on Apr. 1, 2009, provisional application No. 61/166,685, filed on Apr. 3, 2009.

(58) Field of Classification Search
USPC .......................................... 320/107, 108, 115
See application file for complete search history.

(56) References Cited

U.S. PATENT DOCUMENTS

| | | |
|---|---|---|
| 2003/0134639 A1 | 7/2003 | Karger |
| 2006/0113955 A1 | 6/2006 | Nunally |
| 2006/0158152 A1 | 7/2006 | Taniguchi et al. |
| 2006/0184705 A1 | 8/2006 | Nakajima |
| 2007/0103110 A1 | 5/2007 | Sagoo et al. |
| 2007/0191074 A1 | 8/2007 | Harrist et al. |
| 2007/0279002 A1 | 12/2007 | Partovi |
| 2007/0290835 A1 | 12/2007 | Engel Hardt et al. |
| 2008/0150754 A1 | 6/2008 | Quendt |
| 2008/0211320 A1 | 9/2008 | Cook et al. |
| 2008/0258679 A1* | 10/2008 | Manico ............... H02J 7/025 320/106 |
| 2009/0001932 A1 | 1/2009 | Kamijo et al. |
| 2009/0251309 A1 | 10/2009 | Yamasuge |
| 2009/0261778 A1 | 10/2009 | Kook |
| 2009/0308933 A1* | 12/2009 | Osada ............... G06K 19/0701 235/492 |
| 2010/0041332 A1 | 2/2010 | Flygh et al. |
| 2010/0148723 A1 | 6/2010 | Cook et al. |
| 2010/0194335 A1 | 8/2010 | Kirby et al. |
| 2010/0225270 A1 | 9/2010 | Jacobs et al. |
| 2015/0137750 A1 | 5/2015 | Kirby et al. |

FOREIGN PATENT DOCUMENTS

| | | |
|---|---|---|
| CN | 1845622 A | 10/2006 |
| CN | 1956288 A | 5/2007 |
| CN | 101061386 A | 10/2007 |
| CN | 101188365 A | 5/2008 |
| CN | 101330229 A | 12/2008 |
| CN | 101350856 A | 1/2009 |
| FR | 2883428 A1 | 9/2006 |
| GB | 2273614 | 6/1994 |
| GB | 2352887 A | 2/2001 |
| GB | 2396261 A | 6/2004 |
| JP | 2001186676 A | 7/2001 |
| JP | 2003289352 A | 10/2003 |
| JP | 2005151609 A | 6/2005 |
| JP | 2005210843 A | 8/2005 |
| JP | 2006141170 A | 6/2006 |
| JP | 2006166570 A | 6/2006 |
| JP | 2006201969 A | 8/2006 |
| JP | 2006314181 A | 11/2006 |
| JP | 2006353042 A | 12/2006 |
| JP | 2007166763 A | 6/2007 |
| JP | 2007306288 A | 11/2007 |
| JP | 2008148148 A | 6/2008 |
| JP | 2008283804 A | 11/2008 |
| JP | 2008301554 A | 12/2008 |
| JP | 2009011129 A | 1/2009 |
| JP | 2009253763 A | 10/2009 |
| KR | 20040028170 A | 4/2004 |
| KR | 20080036702 A | 4/2008 |
| WO | WO-2008109489 A2 | 9/2008 |
| WO | 2008133806 A1 | 11/2008 |

\* cited by examiner

WIRELESS POWER TRANSFER FOR CHARGEABLE DEVICES

CROSS REFERENCE TO RELATED APPLICATION

This application is a divisional of U.S. patent application Ser. No. 12/604,223, filed on Oct. 22, 2009, the disclosure of which is hereby expressly incorporated by reference in its entirety herein, and which claims priority benefit under 35 U.S.C. §119(e) to:

U.S. Provisional Patent Application No. 61/165,876 entitled "GENERAL WIRELESS CHARGING CONFIGURATIONS" filed on Apr. 1, 2009, the disclosure of which is hereby incorporated by reference in its entirety;

U.S. Provisional Patent Application No. 61/158,396 entitled "WIRELESS CHARGING" filed on Mar. 8, 2009, the disclosure of which is hereby incorporated by reference in its entirety; and U.S. Provisional Patent Application No. 61/166,685 entitled "COMBINING WIRELESS CHARGING CAPABILITY AND THE ABILITY TO RECEIVE A WIRELESS CHARGE IN A SINGLE PORTABLE COMPUTING DEVICE" filed on Apr. 3, 2009, the disclosure of which is hereby incorporated by reference in its entirety.

BACKGROUND

Field

The present invention relates generally to wireless charging, and more specifically to bidirectional charging, portable charging devices, and transmission of data between electronic devices while charging at least one of the electronic devices.

Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for wireless charging of devices while exchanging information among the devices. A need also exists for portable devices configured for receiving and transmitting power as well as bidirectional transmission of wireless power among devices.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
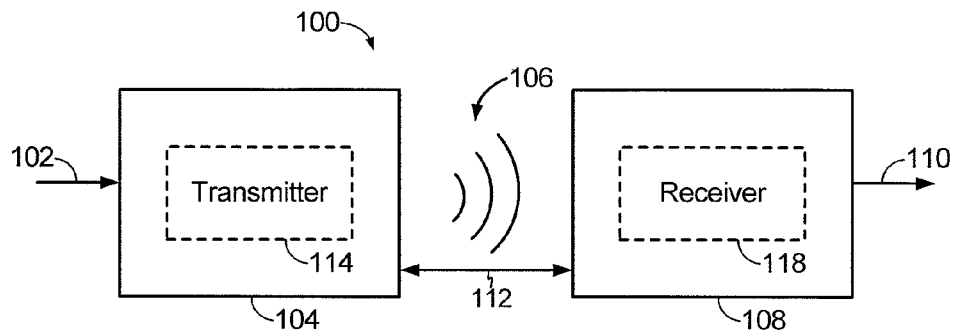
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the substantially unmodulated resonant frequency of receiver 108 and the resonant frequency of transmitter 104 are substantially identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
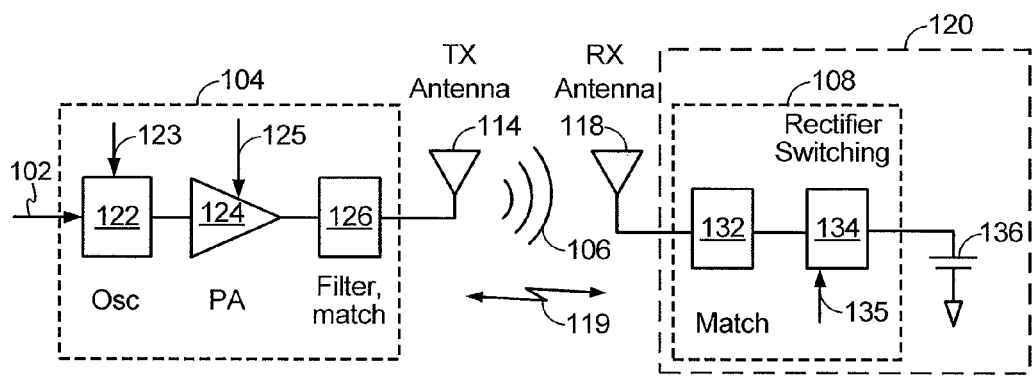
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
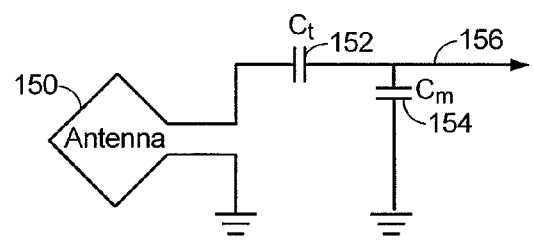
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Exemplary embodiments of the invention include electronic devices configured for both receiving and transmitting wireless power. As such, various exemplary embodiments are directed to bidirectional wireless power transmission. Further, according to various exemplary embodiments, electronic devices may be configured to at least one of receive and transmit wireless power while simultaneously exchanging data with at least one other electronic device. Moreover, exemplary embodiments include a charging system having a base station charger coupled to a power source and configured for charging one or more portable charging pads.

Figure 4:
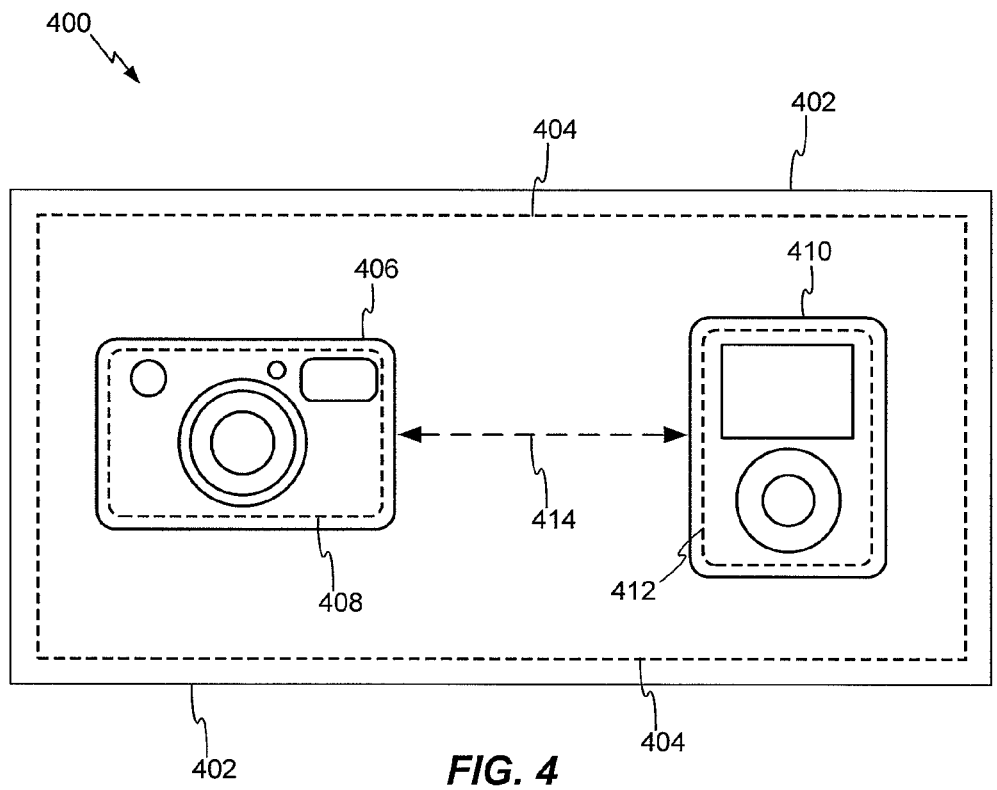
FIG. 4 depicts a charging system including a charging device and a plurality of wirelessly chargeable devices, in accordance with an exemplary embodiment of the present invention.

FIG. 4 depicts a charging system 400 including a charging device 402 having a transmit antenna 404 coupled thereto. Charging device 402 may comprise any known and suitable wireless charging device. Charging system 400 also includes a first chargeable device 406 having an associated antenna 408 and a second chargeable device 410 having an associated antenna 412. First chargeable device 406 and second chargeable device 410 may each comprise any known and suitable chargeable device. As non-limiting examples, first chargeable device 406 and second chargeable device 410 may each comprise a cellular telephone, a portable media player, a camera, a gaming device, a navigation device, a headset (e.g., a Bluetooth headset), a tool, a toy, or any combination thereof. As described more fully below, first chargeable device 406 and second chargeable device 410 may each be configured to receive wireless power from transmit antenna 404 and simultaneously receive information from at least one other electronic device, transmit information to at least one other electronic device, or both.

More specifically, transmit antenna 404 may be configured to receive power, via a transmitter (e.g., transmitter 104 of FIG. 2), from a power source and, upon receipt of the power, may wirelessly transmit power within an associated near-field. Further, wireless power transmitted by transmit antenna 404 may be received by an antenna within an associated coupling mode-region. For example, power transmitted by transmit antenna 404 may be received by antenna 408 and stored within a battery (e.g., battery 136 of FIG. 2) within first chargeable device 406. More specifically, power transmitted from transmit antenna 404 may be received by receive antenna 408 and a receiver, such as receiver 108 of FIG. 2, which is coupled to a battery of first chargeable device 406. Similarly, power transmitted by transmit antenna 404 may be received by antenna 412 and stored within a battery (e.g., battery 136 of FIG. 2) within second chargeable device 410.

It is noted that transmit antenna 404 may be configured to simultaneously transmit power to one or more antennas within a near-field of transmit antenna 404. Moreover, although charging system 400 includes only one transmit antenna coupled to charging device 402 and two chargeable devices positioned proximate thereto, embodiments of the present invention are not so limited. Rather, a charging system including a charging device having any number of transmit antennas coupled thereto and any number of chargeable devices positioned proximate thereto is within the scope of the present invention.

Furthermore, in accordance with an exemplary embodiment, first chargeable device 406 and second chargeable device 410 may each be configured for sharing data with at least one other electronic device. More specifically, as an example, first chargeable device 406 may be configured to establish a communication link with at least one other electronic device and, upon establishing the communication link, may share information (e.g., audio files, data files, or video files) with the at least one other electronic device. A communication link may be established through any known and suitable manner For example, a communication link could be established via near-field communication (NFC) means, via reflected impedance means, via a local area network (LAN), or via a personal area network (PAN). As an example, first chargeable device 406 may be configured to establish a communication link 414 with second chargeable device 410 via any known and suitable manner and, upon establishment of communication link 414, information may be shared between first chargeable device 406 and second chargeable device 410. More specifically, after communication link 414 has been established between first chargeable device 406 and second chargeable device 410, first chargeable device 406 may transmit information to second chargeable device 410 and first chargeable device 406 may receive information from second chargeable device 410. It is noted that, initially, an electronic device (e.g., chargeable device 410 or chargeable device 406) may need to be configured to enable information sharing capabilities. However, after initial configuration, the electronic device may be indefinitely adapted for sharing information.

As a result, in accordance with one exemplary embodiment of the present invention, a chargeable device (e.g., second chargeable device 410) may be configured to receive wireless power from a transmit antenna (e.g., transmit antenna 404) and simultaneously receive information from at least one other electronic device (e.g., chargeable device 406), transmit information to at least one other electronic device (e.g., first chargeable device 406), or both. It is noted that if communication link 414 comprises a near-field communication link, a chargeable device (e.g., second chargeable device 410) may be configured to receive information from at least one other electronic device (e.g., chargeable device 406) or transmit information to at least one other electronic device (e.g., first chargeable device 406) immediately subsequent or prior to receiving wireless power from a transmit antenna (e.g., transmit antenna 404).

While wireless power transmission may occur when one device in a wireless power transmission system includes a transmitter and another device includes a receiver, a single device may include both a wireless power transmitter and a wireless power receiver. Accordingly, such an embodiment could be configured to include dedicated transmit circuitry (e.g., a transmit power conversion circuit and a transmit antenna) and dedicated receiver circuitry (e.g., a receive antenna and a receive power conversion circuit). Accordingly, the various exemplary embodiments disclosed herein identify bidirectional power transmission, namely, the capability for a device to both receive wireless power at the device and to transmit wireless power from the device.

Various benefits of such a configuration include the ability of a device to receive and store wireless power and then to subsequently transmit or "donate" stored power to another receiving or "absorbing" device. Accordingly, such a configuration may also be considered as a "peer-to-peer" "charitable" charging configuration. Such a device-charging arrangement provides considerable convenience in location under which charging occurs (i.e., the receiver or "absorbing" device need not necessarily receive a charge from an inconveniently located or unavailable charging pad).

In accordance with another embodiment of the present invention, a chargeable device having at least one antenna may be configured to transmit wireless power to at least one other chargeable device and receive wireless power from at least one other chargeable device. More specifically, with reference to FIG. 5, first chargeable device 406 having antenna 408 may be configured to transmit wireless power to second chargeable device 410 having antenna 412, and vice versa. Accordingly, each of first chargeable device 406 and second chargeable device 410 may be configured for bidirectional wireless charging. An exemplary approach for such bidirectional wireless charging is described in U.S. patent application Ser. No. 12/552,110, entitled "BIDIREC- TIONAL WIRELESS POWER TRANSMISSION" filed on Sep. 1, 2009, the details of which are incorporated by reference herein.

Figure 5:
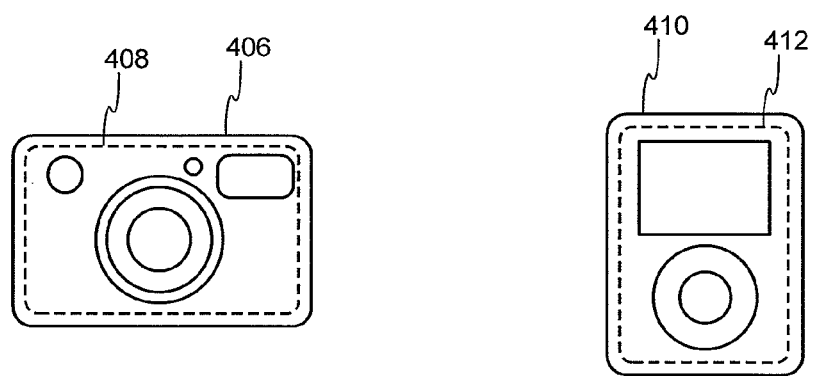
FIG. 5 illustrates a plurality of electronic devices configured for receiving and transmitting wireless power, according to an exemplary embodiment of the present invention.

With continued reference to FIG. 5, various contemplated methods of operating an electronic device configured to transmit and receive wireless power will now be described. It is noted that although various exemplary embodiments are described with reference to first chargeable device 406 requesting power from second chargeable device 410, second chargeable device 410 may similarly request power from first chargeable device 406.

At any time, first chargeable device 406 may request power from second chargeable device 410 and, in response to a power request, second chargeable device 410 may either decline or accept the request. Criteria for determining whether a power request is accepted or declined may be implementation specific and may include various factors. Such factors may include, for example only, an amount of power requested by first chargeable device 406, whether second chargeable device 410 includes a sufficient amount of energy to provide first chargeable device 406 with power, whether second chargeable device 410 is configured to source an adequate amount of current to charge first chargeable device 406, an estimated amount of time before second chargeable device 410 may receive a charge, an estimated standby time after second chargeable device 410 provides power to first chargeable device 406, or any combination thereof. Furthermore, the determination may be dependent on a user-defined preference. Moreover, a device user may receive a real-time prompt asking whether to accept or decline the power request. Upon accepting a charge request, second chargeable device 410 may wirelessly transmit power, which may be received by first chargeable device 406.

Figure 6:
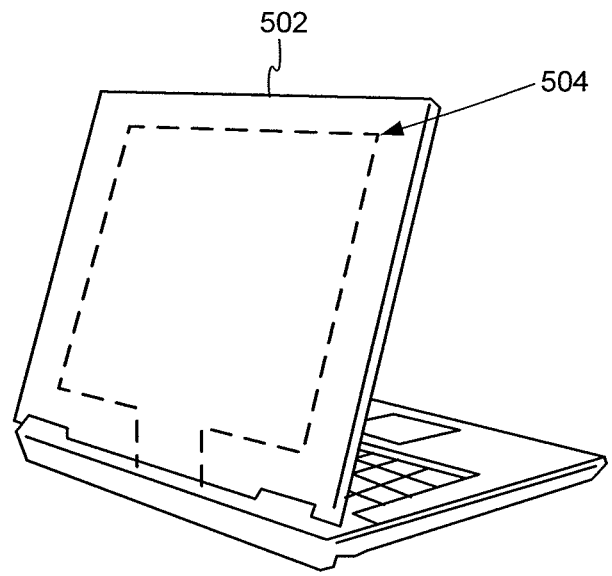
FIG. 6 depicts an electronic device having an antenna coupled thereto, according to an exemplary embodiment of the present invention.
Figure 7:
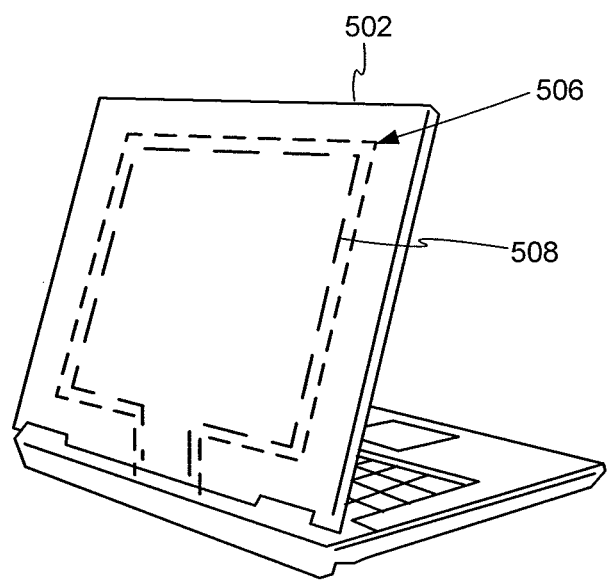
FIG. 7 illustrates an electronic device having a transmit antenna and a receive antenna coupled thereto, in accordance with an exemplary embodiment of the present invention.

FIG. 6 illustrates an electronic device 502 having an antenna 504 coupled thereto. Electronic device 502 may comprise any known electronic device. In the example illustrated in FIG. 6, electronic device 502 comprises a laptop computer wherein antenna 504 is coupled to a lid (i.e., the monitor) of the laptop computer. According to one exemplary embodiment, antenna 504 and associated circuitry (not shown) may be configured for both receiving wireless power and transmitting wireless power. According to another exemplary embodiment, as illustrated in FIG. 7, electronic device 502 may comprise a receive antenna 506 and associated receiver circuitry (not shown) configured for receiving wireless power and a transmit antenna 508 and associated transmitter circuitry (not shown) configured for transmitting wireless power. It is noted that each of antenna 504, receive antenna 506, and transmit antenna 508 may be coupled to electronic device 502 in a manner so as to avoid any electrical interference between the antennas and any metallic components of electronic device 502 (e.g., a metallic display of electronic device 502).

In either exemplary embodiment, the antenna configured to receive wireless power (i.e., antenna 504 or receive antenna 506) may interface with an element of electronic device 502, such as a power circuit, a battery, or any combination thereof. Accordingly, power received by antenna 504 or antenna 506 may be conveyed to the element (e.g., a battery, a power circuit, or any combination thereof) of electronic device 502. Further, the antenna configured to transmit wireless power (i.e., antenna 504 or transmit antenna 508) may interface with a power source of electronic device 502, such as a power circuit, a battery, or any combination thereof. Accordingly, power may be conveyed from the power source (e.g., a battery, a power circuit, or any combination thereof) of electronic device 502 to antenna 504 or antenna 508, which may then wirelessly transmit power within an associated near-field region.

Figure 8:
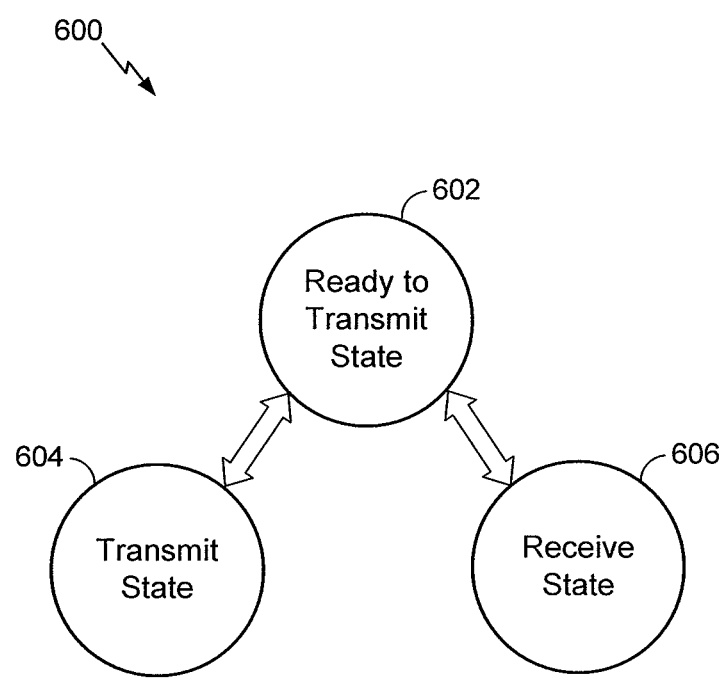
FIG. 8 illustrates a state machine diagram depicting operational states of an electronic device configured for receiving and transmitting wireless power, according to an exemplary embodiment of the present invention.

FIG. 8 illustrates a state machine diagram 600 for an electronic device configured for both receiving wireless power and transmitting wireless power. At any time while an energy level (i.e., an amount of battery charge) of the electronic device (e.g., electronic device 502) is greater than a predetermined threshold level, the electronic device may operate in a "READY to TRANSMIT STATE" 602. Allowing an electronic device to transmit energy only if the electronic device includes an energy level greater than a predetermined threshold level may prevent the electronic device from charging another electronic device without having sufficient charge to do so, or if doing so would significantly drain the power from the electronic device rendering it in need of immediate charge.

If at any time while the electronic device is in READY to TRANSMIT ENERGY STATE 602, another electronic device configured for receiving a wireless charge is positioned within a charging region of the electronic device, an authentication process between the electronic devices may occur. After the devices have been successfully authenticated, the electronic device may transition to a "TRANSMIT STATE" 604, wherein the electronic device may transmit power to the another chargeable device. Furthermore, if at any time while the electronic device is in READY to TRANSMIT ENERGY STATE 602, the electronic device is positioned within a charging region of another electronic device configured to transmit wireless power, an authentication process between the electronic devices may occur. Upon successful authentication, the electronic device may transition to a "RECEIVE STATE" 606, wherein the electronic device may receive a wireless charge from the another electronic device. It is noted that the electronic device may be configured to simultaneously transmit wireless power and receive wireless power. Accordingly, the electronic device may simultaneously be in TRANSMIT STATE 604 and RECEIVE STATE 606.

Figure 9:
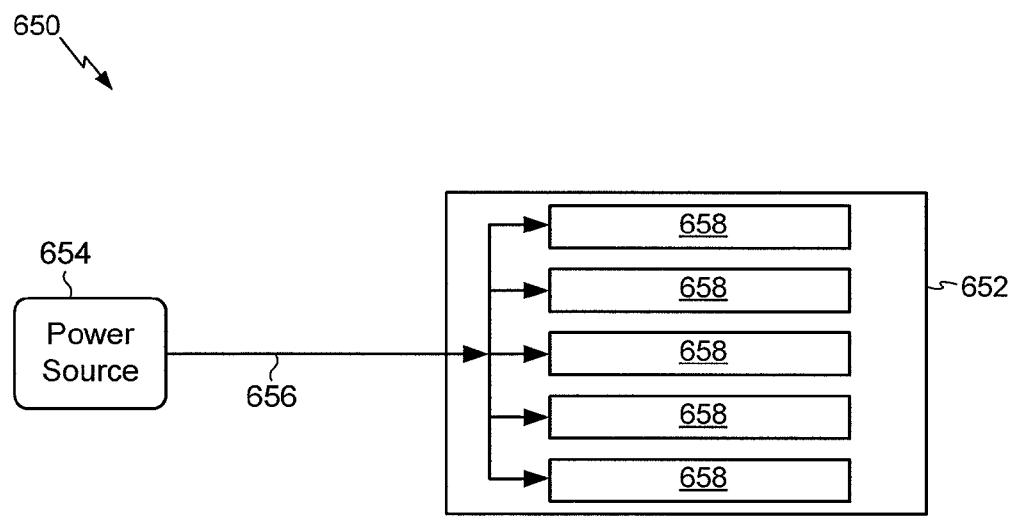
FIG. 9 depicts a charging system having a charger and at least one portable charging pad coupled thereto, in accordance with an exemplary embodiment of the present invention.

FIG. 9 illustrates a charging system 650, in accordance with another exemplary embodiment of the present invention. Charging system 650 may include a charger 652 configured for coupling to a power source 654 via a power connector 656. Charger 652 may also be referred to herein as a "base station charger." Power source 654 may comprise any known, suitable power source, such as a power outlet. Moreover, power connector 656 may comprise any known, suitable power connector, such as a power cord.

Figure 10:
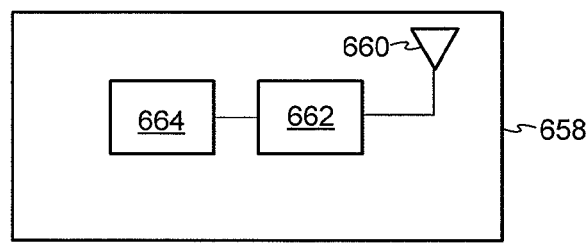
FIG. 10 illustrates a portable charging pad, in accordance with an exemplary embodiment of the present invention.

Base station charger 652 may comprise at least one port (not shown) wherein each port is configured to receive a portable charging pad 658. It is noted that each port may be configured to mechanically couple a portable charging pad to base station charger 652, electrically couple a portable charging pad to base station charger 652, or both. Portable charging pad 658 may comprise an antenna 660 and associated circuitry 662 (see FIG. 10). Portable charging pad 658 may also comprise an energy storage device 664 (see FIG. 10) such as, for example only, a chargeable battery, a storage capacitor, a MEMS energy storage device, or any combination thereof. Base station charger 652 may be configured to receive power via power source 654 and power connector 656 and supply power to one or more charging pads 658 via any suitable manner. For example, base station charger 652 may comprise one or more transmit antennas and may be configured to wirelessly transmit power to one or more charging pads 658. As another example, base station charger 652 may be configured to convey power to one or more portable charging pads 658 coupled thereto via a wired connection. Further, portable charging pad 658 may be configured to be removed from charger 652 and may be moved to any location for subsequent charging of one or more chargeable devices.

Exemplary methods of operating a charging system (e.g., charging system 650) will now be described. One or more portable charging pads 658 may be coupled or placed proximate to base station charger 652. Base station charger 652, which may receive power via power source 654 and power connector 656, may transmit power to the one or more portable charging pads 658 via any known and suitable manner. After receiving a charge, at least one portable charging pad 658 may be removed from base station charger 652 and subsequently used for charging at least one chargeable device.

As an example, a user may charge a portable charging pad 658 via base station charger 652 positioned at a location such as a house or an office and, thereafter, remove the portable charging pad 658, and use the portable charging pad 658 to wireless charge at least one chargeable device positioned in a vehicle, such as an automobile or an airplane. As a more specific example, a user may position the portable charging pad 658 on an airplane tray table, position a media player within a charging region of the portable charging pad 658, and charge the media player while the media is in either an "off" or an "on" operational state. Accordingly, the battery life of the media player may be prolonged without a need for a wired power connection.

As another example, a user may charge a portable charging pad 658 via base station charger 652 positioned at a location in a residence, such as an office or a den. Thereafter, the user may remove the portable charging pad 658 and use the portable charging pad 658 to wireless charge at least one chargeable device at another location that may not include a power outlet. As a more specific example, a user may position the portable charging pad 658 on an outdoor table or an entry-way table that may not be proximate to a power outlet. A user may then position a laptop computer within a charging region of the portable charging pad 658 and charge the laptop computer while the laptop computer is in either an "off" or an "on" operational state. Accordingly, the battery life of the laptop computer may be prolonged without a need for a wired power connection.

Figure 11:
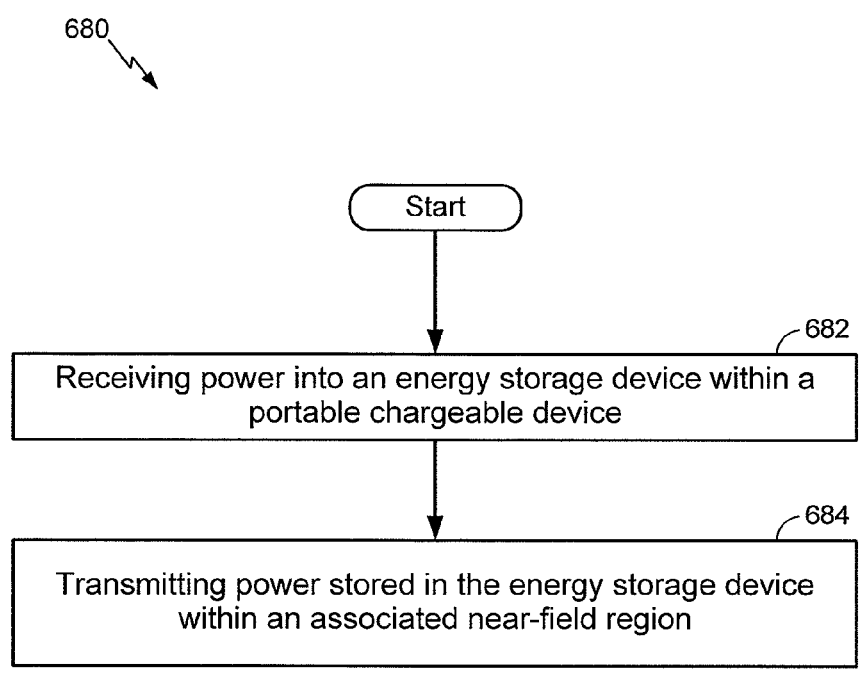
FIG. 11 is a flowchart illustrating a method, in accordance with an exemplary embodiment of the present invention.

FIG. 11 is a flowchart illustrating a method 680, in accordance with one or more exemplary embodiments. Method 680 may include receiving power with a portable chargeable device (depicted by numeral 682). Method 680 may further include transmitting wireless power from the portable chargeable device within an associated near-field region (depicted by numeral 684).

As will be understood by a person having ordinary skill in the art, "surface computing" is a term associated with a technology wherein a user may interact with a computer and/or an electronic device positioned on a surface of an object (e.g., a table) through the surface of an object instead of a keyboard, mouse, or monitor. A multi-touch surface may facilitate surface computing by allowing the manipulation of objects displayed on a surface through surface contact (e.g., touch by multiple fingers or multiple users). Further, content may be transferred between two or more devices positioned on the surface of the object using a unique identifier assigned to each device.

Figure 12:
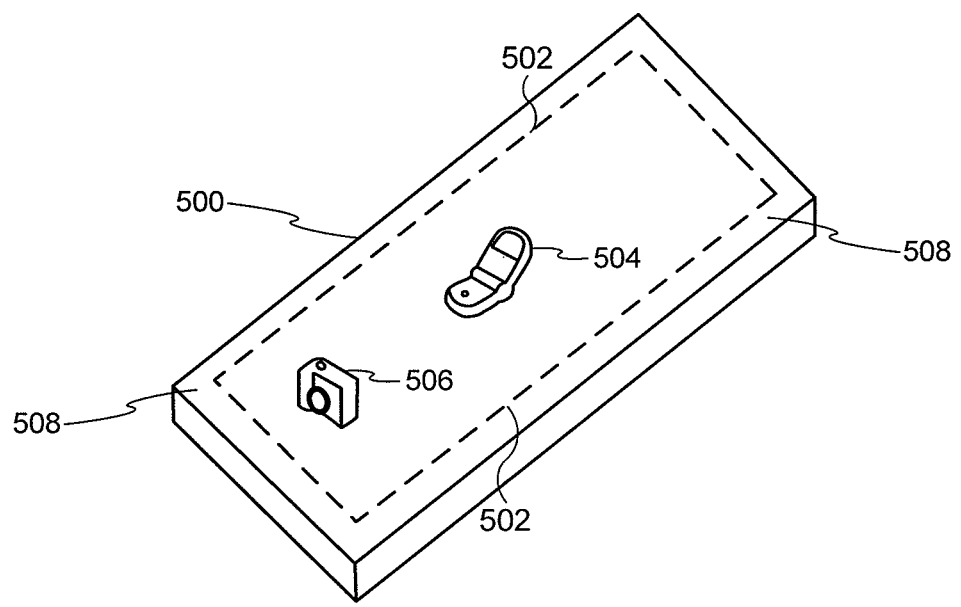
FIG. 12 illustrates a surface computing device configured for transmitting wireless power, according to an exemplary embodiment of the present invention.

FIG. 12 illustrates a surface computing device 500 configured for wireless charging, in accordance with various exemplary embodiments of the present invention. Device 500 may include a display, which may comprise a touch sensitive plasma screen. Further, device 500 may include cameras, projectors, speakers, etc., as will be understood by a person having ordinary skill in the art. In addition, wireless charger 500 may include a transmit antenna 502 configured to wirelessly transmit power within an associated near-field region.

As configured, device 500 may detect and authenticate the presence of an electronic device positioned on a surface 508 of device 500. The presence of a device, for example, a mobile phone 504 or a digital camera 506, positioned upon device 500 may be determined by detecting a field disturbance of a magnetic field established between transmitter antenna 502 and an antenna (not shown) within an electronic device (e.g., mobile phone 504) and configured for receiving wireless power. In addition to detecting the presence of an electronic device, a field disturbance may indicate that an electronic device is ready to receive wireless power, or ready to transmit or receive information. For example, an electronic device positioned on device 500, such as digital camera 506, may transmit a signal, via a wireless charging protocol, requesting a wireless charge, requesting establishment of a wireless data link, such as a Bluetooth (BT) connection, or both. It is noted that any known and suitable data link may be within the scope of the present invention. For example, a data link may comprise a Bluetooth connection, a Wi-Fi connection, a 60 GHz connection, or a UWB connection.

It is noted that before a wireless data link (e.g. a BT connection) may be established between an electronic device (e.g., mobile phone 504 or digital camera 506) and device 500, device 500 may initiate a key exchange to 'pair' the electronic device and device 500. Once paired, a data link may be initiated, allowing data to transfer between device 500 and the electronic device being charged. More specifically, upon establishing the data link, data, such as photographs, videos, or music, may be transferred from, for example, a 'public' directory of the electronic device to device 500. Furthermore, after a data link has been established and data is transferred from the electronic device to device 500, a user may interact with the data in a user-friendly, multi-touch way, while the electronic device positioned on surface 508 receives a wireless charge. As an example, data transferred from the electronic device may be conveyed (e.g., photographs may be displayed or music may be played) by device 500 while the electronic device is charging. It is noted that a device user may access and interact with data stored on the electronic device without transferring the data to device 500.

Figure 13:
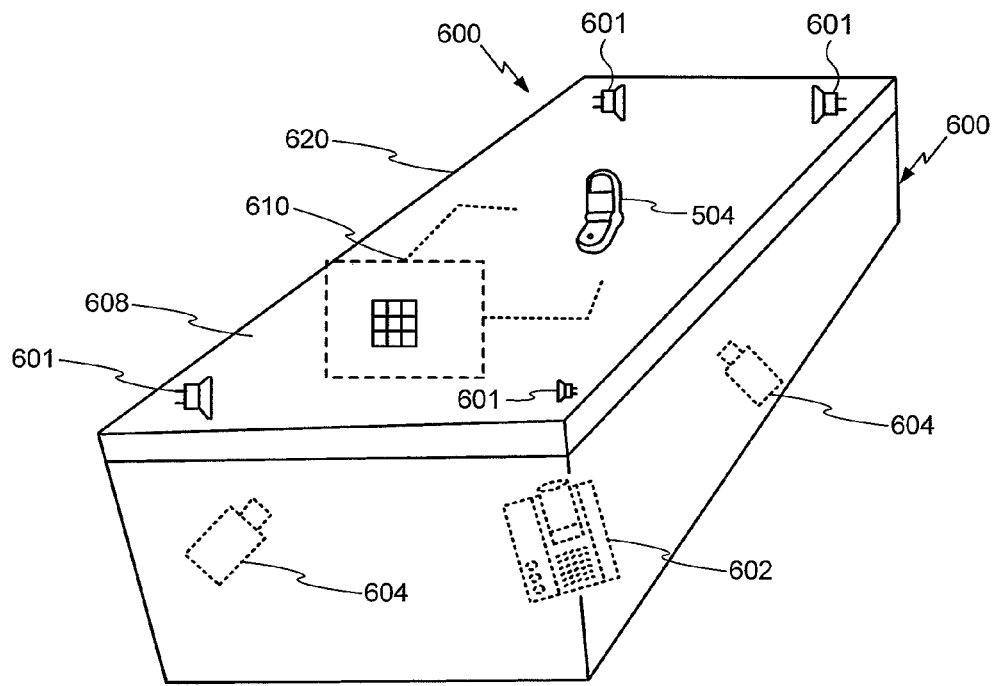
FIG. 13 illustrates another surface computing device configured for transmitting wireless power, according to an exemplary embodiment of the present invention.

FIG. 13 illustrates another surface computing device 600 configured for wireless charging, in accordance with various exemplary embodiments of the present invention. Device 600 includes a transmit antenna 620 configured to wirelessly transmit power within an associated near-field region. According to one exemplary embodiment, device 600 may be implemented as a multi-touch surface configured to display an interactive menu having interactive elements (i.e., controls) associated with at least one of the one or more electronic devices positioned thereon. Device 600 may comprise a camera 604 and projector 602 configured for receiving and transmitting images onto a surface 608 of device 600. Image 610 is one such image representing a keypad from mobile phone 504 projected onto surface 608 of device 600. A projected image of a keypad may enhance the use of mobile phone 504 by presenting a larger area to manipulate phone controls over that available in the confined space available on an actual keypad of mobile phone 504. Furthermore, device 600 may include speakers 601 configured for audibly conveying data, such as an audio file, received from an electronic device, such as mobile phone 504.

Figure 14:
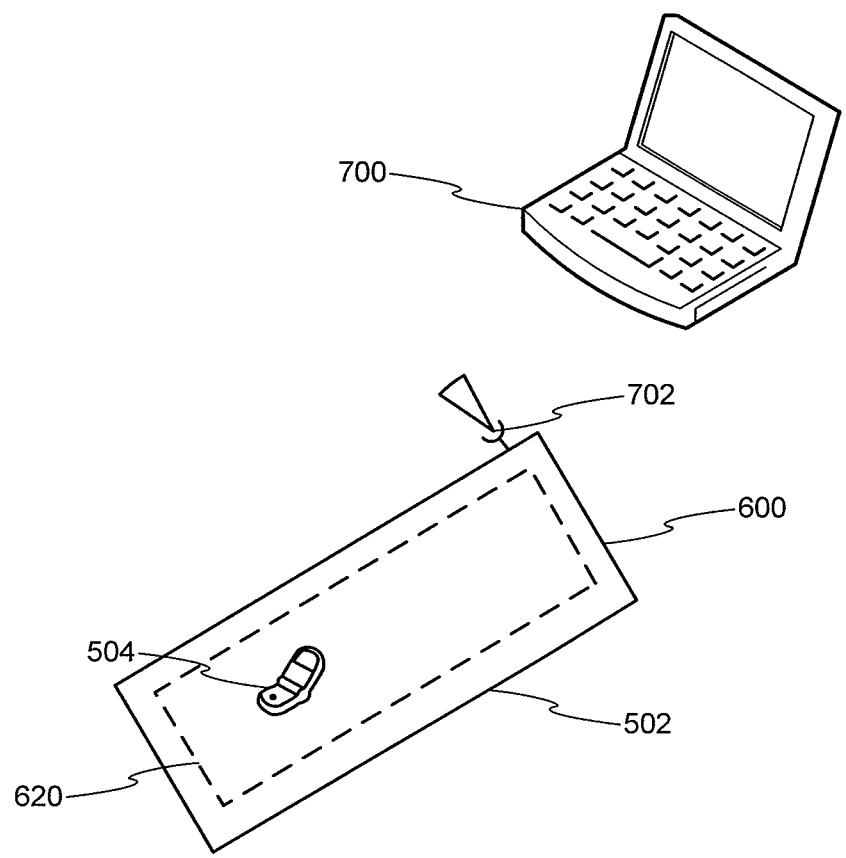
FIG. 14 depicts a system including a surface computing device and a computer, in accordance with an exemplary embodiment of the present invention.

According to another exemplary embodiment, device 600 may be configured to communicate with a stand-alone computer. For example only, device 600 may be configured to communicate with a stand-alone computer via wireless means, such as via a USB adapter or a USB dongle. Accordingly, the stand-alone computer and an associated display may be used to facilitate information exchanges to and from electronic devices placed on device 600 or via the Internet. More specifically, FIG. 14 illustrates a system wherein device 600 is configured to communicate with a computer 700 through a USB dongle 702, which provides a communication link between device 600 and computer 700 by means of, for example, a Bluetooth connection. In this exemplary embodiment, a monitor of computer 700 may be used to manipulate data on the electronic device (e.g., mobile phone 504) positioned upon the surface of device 600. Additionally, computer 700 may provide a communication link to the Internet to enable a connection between the electronic device and the Internet. Accordingly, for example, data may be transferred between mobile phone 504 and computer 700 while the mobile phone 504 is being charged via transmit antenna 620.

Figure 15:
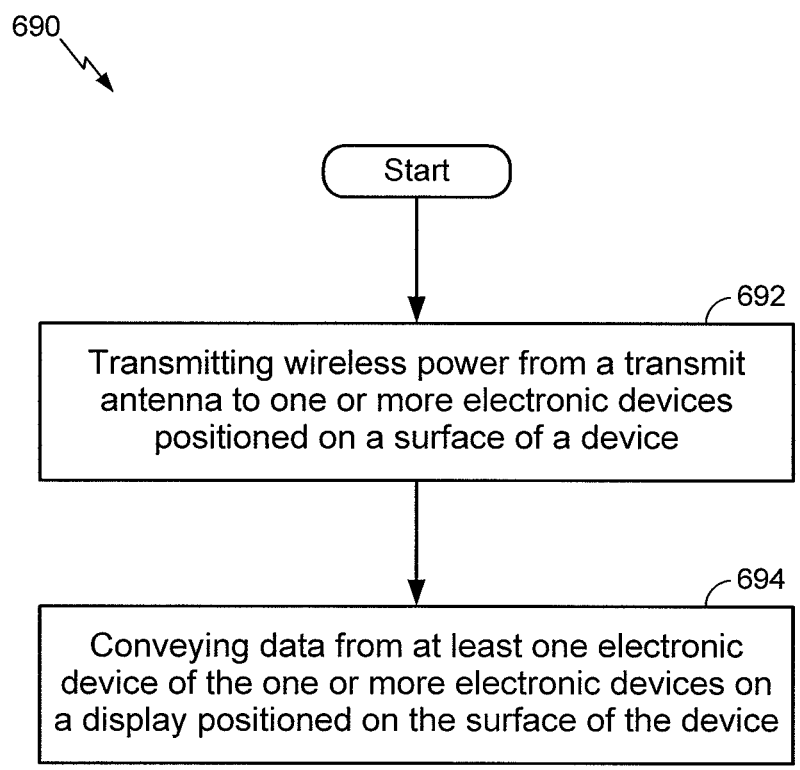
FIG. 15 is a flowchart illustrating another method, in accordance with an exemplary embodiment of the present invention.

FIG. 15 is a flowchart illustrating another method 690, according to one or more exemplary embodiments. Method 690 may include transmitting wireless power from a transmit antenna to one or more electronic devices positioned on a surface of a device (depicted by numeral 692). Furthermore, method 690 may include conveying data from at least one electronic device of the one or more electronic devices on a display positioned on the surface of the device (depicted by numeral 694).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A charging apparatus, comprising:
   an energy storage device; and
   an antenna circuit configured to:
   wirelessly receive power from a first device via a power antenna, wherein the energy storage device is configured to store at least a portion of the wirelessly received power, and
   transmit at least a portion of the power stored in the energy storage device via the power antenna to wirelessly power or charge a plurality of second devices; and
   a controller circuit configured to:
   transition the antenna circuit to transmit at least a portion of the power stored in the energy storage device upon detection of a presence of one or more of the plurality of second devices, and
   transition the antenna circuit to receive wireless power upon placement of the antenna circuit within a charging region of the first device.

2. The charging apparatus of claim 1, further comprising a portable charging pad comprising the energy storage device and the antenna circuit.

3. The charging apparatus of claim 1, wherein the antenna circuit is further configured to perform at least one of transmitting or receiving data via the power antenna.

4. The charging apparatus of claim 3, wherein the antenna circuit is configured to perform the at least one of transmitting or receiving data via the power antenna simultaneously with wirelessly receiving power from the first device or transmitting the stored power to one or more of the plurality of second devices.

5. The charging apparatus of claim 3, wherein the antenna circuit is configured to perform at least one of wirelessly receiving power from the first device and transmitting the stored power to one or more of the plurality of second devices while exchanging data with a third device.

6. The charging apparatus of claim 1, wherein the antenna circuit is configured to wirelessly transmit the at least a portion of the power stored in the energy storage device subsequent to wirelessly receiving power.

7. The charging apparatus of claim 1, wherein the antenna circuit is configured to wirelessly transmit power if a power level of energy storage device is above a threshold.

8. The charging apparatus of claim 1, wherein the charging device is further configured to receive information from the plurality of second devices and to transmit the information to a third device.

9. A method of wireless power transfer, comprising:
   wirelessly receiving power from a first device via a power antenna;
   storing at least a portion of the wirelessly received power in an energy storage device;
   wirelessly transmitting at least a portion of the power stored in the energy storage device via the power antenna at a level sufficient to power or charge a plurality of second devices;
   transitioning the power antenna to transmit at least a portion of the power stored in the energy storage device upon detection of a presence of one or more of the plurality of second devices; and
   transitioning the power antenna to receive wireless power upon placement of the antenna circuit within a charging region of the first device.

10. The method of claim 9, wherein wirelessly transmitting at least a portion of the power stored in the energy storage device comprises wirelessly transmitting power if a power level of the energy storage device is above a threshold.

11. The method of claim 9, wherein wirelessly receiving power comprises wirelessly receiving power at a portable charging pad.

12. The method of claim 9, wherein wirelessly receiving power comprises wirelessly receiving power at one of a cellular telephone, a portable media player, a camera, a gaming device, a navigation device, a headset, a tool, or a toy.

13. The method of claim 9, further comprising receiving a request for wireless power transmission from the one or more of the plurality of second devices.

14. The method of claim 9, further comprising authenticating the one or more of the plurality of second devices before wirelessly transmitting power.

15. A charging apparatus, the apparatus comprising:
   means for storing energy;
   means for transferring power configured to:
   wirelessly receive power from a first device via a means for resonating, wherein the means for storing energy is configured to store at least a portion of the wirelessly received power, and
   wirelessly transmit at least a portion of the power stored in the means for storing energy via the means for resonating to wirelessly power or charge a plurality of second devices; and
   means for transitioning the means for transferring power
   to a transmit state to transmit at least a portion of the power stored in the means for storing energy upon detection of a presence of one or more of the plurality of second devices and
   to a receive state to receive power upon placement of the means for transferring power within a charging region of the first device.

16. The apparatus of claim 15, wherein the means for transferring power is configured to wirelessly transmit power stored in the means for storing energy subsequent to wirelessly receiving power.

17. The apparatus of claim 15, wherein the means for transferring power is configured to transmit power if a power level of the means for storing energy is above a threshold.

18. The apparatus of claim 15, further comprising means for performing at least one of transmitting or receiving data configured to receive information from one device and to transmit the information to another device.

* * * * *